(12) United States Patent
Keusenkothen et al.

(10) Patent No.: US 8,119,076 B2
(45) Date of Patent: Feb. 21, 2012

(54) PYROLYSIS REACTOR CONVERSION OF HYDROCARBON FEEDSTOCKS INTO HIGHER VALUE HYDROCARBONS

(75) Inventors: Paul F. Keusenkothen, Houston, TX (US); James N. McCoy, Morristown, NJ (US); Judith Hey, legal representative, Morristown, NJ (US); Frank Hershkowitz, Liberty Corner, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/020,433

(22) Filed: Feb. 3, 2011

(65) Prior Publication Data

US 2011/0123405 A1 May 26, 2011

Related U.S. Application Data

(62) Division of application No. 12/119,762, filed on May 13, 2008, now Pat. No. 7,914,667.

(60) Provisional application No. 60/933,044, filed on Jun. 4, 2007, provisional application No. 60/933,011, filed on Jun. 4, 2007.

(51) Int. Cl.
*C10G 11/20* (2006.01)

(52) U.S. Cl. ........ 422/187; 422/198; 422/623; 422/625; 422/626; 422/627; 422/628; 422/629; 201/37; 201/38; 202/215; 202/217; 202/227; 202/228

(58) Field of Classification Search .............. 201/37–38; 202/215, 217, 227–228; 208/428, 430, 432; 422/187, 198–208, 623, 625–629
See application file for complete search history.

(56) References Cited

U.S. PATENT DOCUMENTS

| | | | |
|---|---|---|---|
| 1,723,679 A | 8/1929 | Coberly et al. |
| 1,843,965 A | 2/1932 | Wulff |
| 1,880,306 A | 10/1932 | Wulff |
| 1,880,307 A | 10/1932 | Wulff |
| 1,880,308 A | 10/1932 | Wulff |
| 1,880,309 A | 10/1932 | Wulff |
| 1,880,310 A | 10/1932 | Wulff |

(Continued)

FOREIGN PATENT DOCUMENTS

BE 491 423 10/1949

(Continued)

OTHER PUBLICATIONS

Bartholome, Von E., "Methods of Energy Addition for Endothermic Gas Reactions at High Temperatures", Zeitschrift fuer Elektrochemid und Angewandte Physikalische Chemie, 1953, vol. 57, No. 7, pp. 497-502 (No translation).

(Continued)

*Primary Examiner* — Robert J Hill, Jr.
*Assistant Examiner* — Brian McCaig

(57) ABSTRACT

In one aspect, the inventive process comprises a process for pyrolyzing a hydrocarbon feedstock containing nonvolatiles in a regenerative pyrolysis reactor system. The inventive process comprises: (a) heating the nonvolatile-containing hydrocarbon feedstock upstream of a regenerative pyrolysis reactor system to a temperature sufficient to form a vapor phase that is essentially free of nonvolatiles and a liquid phase containing the nonvolatiles; (b) separating said vapor phase from said liquid phase; (c) feeding the separated vapor phase to the pyrolysis reactor system; and (d) converting the separated vapor phase in said pyrolysis reactor system to form a pyrolysis product.

5 Claims, 4 Drawing Sheets

U.S. PATENT DOCUMENTS

| | | | |
|---|---|---|---|
| 1,917,627 A | 7/1933 | Wulff | |
| 1,938,991 A | 12/1933 | Wulff | |
| 1,966,779 A | 7/1934 | Wulff | |
| 1,966,185 A | 4/1935 | Wulff | |
| 2,037,056 A | 4/1936 | Wulff | |
| 2,236,534 A | 4/1941 | Hasche | |
| 2,236,555 A | 4/1941 | Wulff | |
| 2,319,679 A | 5/1943 | Hasche et al. | |
| 2,343,866 A | 3/1944 | Hincke | |
| 2,558,861 A | 7/1951 | Liggett | |
| 2,580,766 A | 1/1952 | Hall | |
| 2,645,673 A | 7/1953 | Hasche | |
| 2,678,339 A | 5/1954 | Harris | |
| 2,692,819 A | 10/1954 | Hasche et al. | |
| 2,706,210 A | 4/1955 | Harris | |
| 2,718,534 A | 9/1955 | Harris | |
| 2,796,951 A | 6/1957 | Bogart | |
| 2,813,919 A | 11/1957 | Pearce | |
| 2,830,677 A | 4/1958 | Coberly | |
| 2,845,335 A | 7/1958 | Hasche | |
| 2,851,340 A | 9/1958 | Coberly et al. | |
| 2,885,455 A | 5/1959 | Hennig | |
| 2,886,615 A | 5/1959 | Lindahl | |
| 2,920,123 A | 1/1960 | Oldershaw et al. | |
| 2,921,100 A | 1/1960 | Pettyjohn et al. | |
| 2,956,864 A | 10/1960 | Coberly | |
| 2,967,205 A | 1/1961 | Coberly | |
| 3,024,094 A | 3/1962 | Coberly | |
| 3,093,697 A | 6/1963 | Kasbohm et al. | |
| 3,156,733 A | 11/1964 | Happel et al. | |
| 3,156,734 A | 11/1964 | Happel | |
| 3,796,768 A | 3/1974 | Starzenski et al. | |
| 4,176,045 A | 11/1979 | Leftin et al. | |
| 4,240,805 A | 12/1980 | Sederquist | |
| 4,754,095 A | 6/1988 | Coughenour et al. | |
| 4,929,789 A | 5/1990 | Gupta et al. | |
| 4,973,777 A | 11/1990 | Alagy et al. | |
| 5,080,872 A * | 1/1992 | Jezl et al. | 422/201 |
| 5,138,113 A | 8/1992 | Juguin et al. | |
| 5,976,352 A | 11/1999 | Busson et al. | |
| 6,027,635 A | 2/2000 | Busson et al. | |
| 6,076,487 A | 6/2000 | Wulff et al. | |
| 6,287,351 B1 | 9/2001 | Wulff et al. | |
| 6,322,760 B1 | 11/2001 | Busson et al. | |
| 6,575,147 B2 | 6/2003 | Wulff et al. | |
| 6,632,351 B1 | 10/2003 | Ngan et al. | |
| 7,288,127 B1 | 10/2007 | Wulff et al. | |
| 7,846,401 B2 | 12/2010 | Hershkowitz et al. | |
| 2002/0020113 A1 | 2/2002 | Kennedy et al. | |
| 2007/0191664 A1 | 8/2007 | Hershkowitz et al. | |
| 2009/0008292 A1 | 1/2009 | Keusenkothen et al. | |

FOREIGN PATENT DOCUMENTS

| | | |
|---|---|---|
| CA | 306263 | 12/1930 |
| FR | 841 410 | 5/1939 |
| FR | 1 588 738 | 4/1970 |
| GB | 763675 | 12/1956 |
| GB | 830574 | 3/1960 |
| GB | 959818 | 6/1964 |
| GB | 972153 | 10/1964 |
| GB | 1064447 | 4/1967 |
| GB | 1149798 | 4/1969 |

OTHER PUBLICATIONS

Bixler, Gordon H., et al., "Wulff Process Acetylene", Journal of Industrial and Engineering Chemistry, Washington DC, 1953, vol. 45, No. 12, pp. 2596-2606.

Bogart, Marcel, et al., "The Wulff Process for Acetylene from Hydrocarbons", Petroleum Processing, Mar. 1953, vol. 8, pp. 377-382.

Bogart, Marcel, et al., "Recent Developments in Wulff Acetylene", Chemical Engineering Progress, 1954, vol. 50, No. 7, pp. 372-375.

China and the Japanese Petrochemical Industry, Chemical Economy and Engineering Review, Jul./Aug. 1985, vol. 17, No. 7-8 (No. 190), pp. 47-48.

Holmen, Anders, et al., "Pyrolysis of Natural Gas: Chemistry and Process Concepts", Elsevier Science B. V., Fuel Processing Technology 42 (1995), pp. 249-267.

Jennings, R.J.S., Organic Chemicals from Natural Gas—I, Chemical & Process Engineering, May 1952, vol. 33, pp. 243-246.

Ries, Harold C., "Acetylene, Process Economics Program", Standford Research Institute, Report No. 16, Menlo Park, CA, Sep. 1966, pp. 1-403.

Sherwood, Von Peter W., "Acetylene from Natural Gas and Petroleum", Erdol und Kohle, 1954, vol. 7, No. 18, pp. 819-822.

Sneddon, Richard, "Successful Acetylene Synthesis", Petroleum Engineer, Jan. 1954, No. 26, pp. C5-C8.

Weaver, Theodore, "Process Engineering—Economics of Acetylene by Wulff Process", Chemical Engineering Progress, 1953, vol. 49, No. 1, pp. 35-39.

* cited by examiner

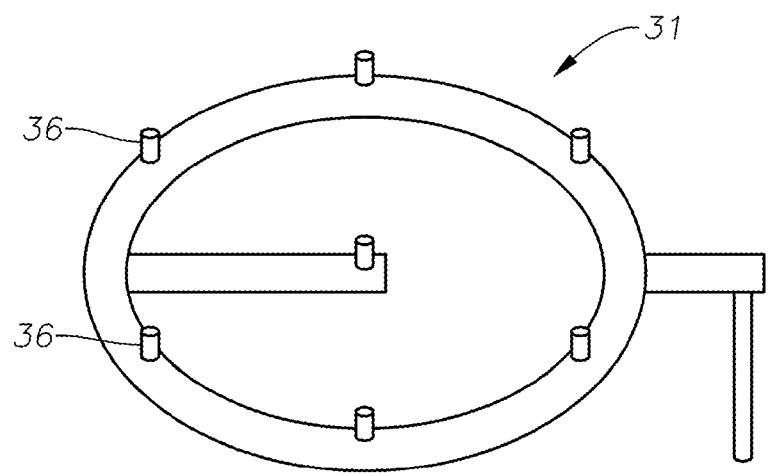
Fig. 3
Fig. 4A
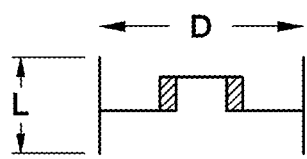
Fig. 4
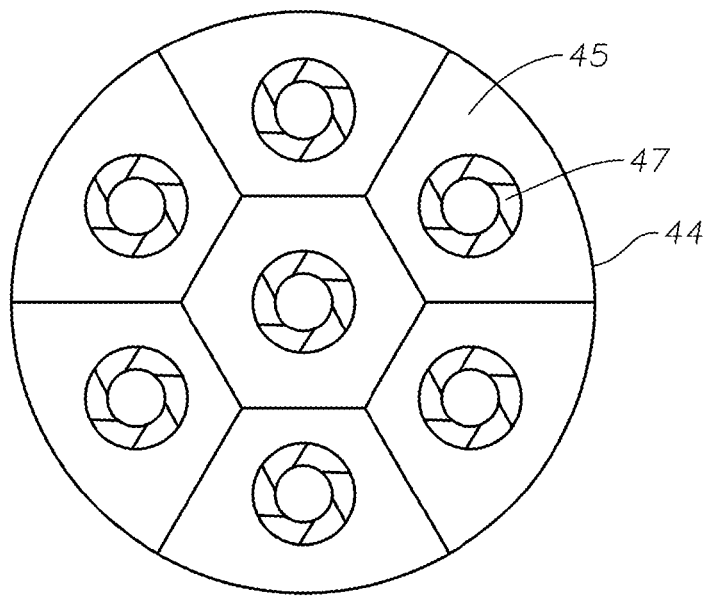

PYROLYSIS REACTOR CONVERSION OF HYDROCARBON FEEDSTOCKS INTO HIGHER VALUE HYDROCARBONS

RELATIONSHIP TO OTHER APPLICATIONS

This application is a divisional of U.S. application Ser. No. 12/119,762, now U.S. Pat. No. 7,914,667, filed May 13, 2008, which claims benefit of and priority to U.S. provisional application Ser. No. 60/933,044, filed Jun. 4, 2007, and U.S. provisional application Ser. No. 60/933,011, filed Jun. 4, 2007, the entirety of which are incorporated herein by reference.

FIELD OF THE INVENTION

This invention pertains to converting hydrocarbons using regenerative pyrolysis reactors. The invention relates to a process for cracking hydrocarbons present in hydrocarbon feedstocks containing nonvolatiles, in a regenerative pyrolysis reactor. The nonvolatiles are removed from the feedstocks before the hydrocarbons undergo thermal pyrolysis. More particularly the invention relates to a process and apparatus for improving the quality of nonvolatile-containing feedstocks to a regenerative pyrolysis reactor system or a plurality of such pyrolysis reactor systems.

BACKGROUND OF THE INVENTION

Conventional steam crackers are known as an effective tool for cracking high-quality feedstocks that contain a large fraction of volatile hydrocarbons, such as ethane, gas oil, and naphtha. Similarly, regenerative pyrolysis reactors are also known and conventionally used for converting or cracking and to execute cyclic, high temperature chemistry such as those reactions that may be performed at temperatures higher than can suitably be performed in conventional steam crackers. Regenerative reactor cycles typically are either symmetric (same chemistry or reaction in both directions) or asymmetric (chemistry or reaction changes with step in cycle). Symmetric cycles are typically used for relatively mild exothermic chemistry, examples being regenerative thermal oxidation ("RTO") and autothermal reforming ("ATR"). Asymmetric cycles are typically used to execute endothermic chemistry, and the desired endothermic chemistry is paired with a different chemistry that is exothermic (typically combustion) to provide heat of reaction for the endothermic reaction. Examples of asymmetric cycles are Wulff cracking, Pressure Swing Reforming, and other regenerative pyrolysis reactor processes. Regenerative pyrolysis reactors are generally known in the art as being capable of converting or cracking hydrocarbons. However, they have not achieved commercial or widespread use for hydrocarbon conversion, due at least in part to the fact that they have not been successfully scaled well to an economical size. This failure is commercially, due at least in large part to the inability of the equipment to adequately control and contend with the very high temperatures and the way that fuel and oxidant are combined during the regeneration or heating stage of the process. This defect results in thermal degradation at a commercial scale. The high temperatures are difficult to position and contain for extended periods of time and lead to premature equipment failure. A solution was proposed in U.S. patent application Ser. No. 11/643,541 filed in the USPTO, on Dec. 21, 2006, entitled "Methane Conversion to Higher Hydrocarbons," related primarily to methane feedstocks for pyrolysis systems, utilizing an inventive deferred combustion process.

As with steam crackers, regenerative pyrolysis reactors also are well suited for volatized or volatizable feedstocks that are substantially free of nonvolatile components, such as metals and other residual or nonvolatizable components, which would otherwise lay down and build up in the reactor as ash. Pyrolysis reactors typically operate at higher temperatures than steam crackers. Nonvolatiles may be defined broadly to mean any resid, metal, mineral, ash-forming, asphaltenic, tar, coke, or other component, or contaminant within the feedstock that will not vaporize below a selected boiling point or temperature and which, during or after pyrolysis, may leave an undesirable residue or ash within the reactor system. The nonvolatile components of most concern are those that deposit as ash within the reactor system and cannot be easily removed by regeneration. Many hydrocarbon coke components may be merely burned out of the bed at the high temperature typically used in pyrolysis reactor systems and thus tend to be of less concern than some other residual components. Some nonvolatile feed components, such as metals and/or minerals, may leave an ash component behind that even at the high regeneration temperatures is difficult to remove from a reactor.

Typically, regenerative reactors include a reactor bed or zone, typically comprising some type of refractory material, where the reaction takes place within the reactor system. Conventional regenerative reactors typically deliver a stream of fuel, oxidant, or a supplemental amount of one of these reactants, directly to a location somewhere within the flow path of the reactor bed. The delivered reactants then are caused to exothermically react therein and heat the reactor media or bed. Thereafter, the reacted reactants are exhausted and a pyrolysis feedstock, such as a hydrocarbon feed stream, preferably vaporized, is introduced into the heated region of the media or bed, and exposed to the heated media to cause heating and pyrolysis of the reactor feedstock into a pyrolyzed reactor feed. The pyrolyzed reactor feed is then removed from the reaction area of the reactor and quenched or cooled, such as in a quench region of the reactor system, to halt the pyrolysis reaction and yield a pyrolysis product.

However, as with steam cracking, economics may favor using lower cost feedstocks such as, by way of non-limiting examples, crude oil, heavy distillate cuts, contaminated naphthas and condensates, and atmospheric resids, as feedstocks for regenerative pyrolysis reactors. Unfortunately, these economically favored feedstocks typically contain undesirable amounts of nonvolatile components and have heretofore been unacceptable as regenerative reactor feedstocks. The nonvolatiles lead to fouling of the reactor through deposition of materials such as ash, metals, and/or coke. Regenerative pyrolysis reactors do not have the flexibility to process such otherwise economically crack favorable feedstocks because, although coke can typically be burned off, deposits or buildup of ash and metals within the reactor cannot easily be burned or removed. The critical concentration of nonvolatiles within a particular feedstock may vary depending upon variables such as the intended process, feedstock conditions or type, reactor design, operating parameters, etc. Generally, nonvolatile concentrations (e.g., ash, metals, resids, etc.) in excess of 2 ppmw (ppm by weight) of the feed stream to the reactor will cause significant fouling in a pyrolysis reactor. Some economically desirable lower cost feeds may contain up to 10 percent by weight of nonvolatiles, while still other feeds may contain well in excess of 10 weight percent of nonvolatiles. Since nonvolatiles do not vaporize, but decompose to form ash, metals, tar, and/or coke when heated above about 600° F. (315° C.) (in an oxidizing environment), the nonvolatiles present in disadvantaged feedstocks lay down or build up as a foulant in the reaction section of pyrolysis reactors, which increases pressure drop through the reactor and leads to plugging and decreased efficiency. Generally, only low levels of nonvolatiles (e.g., <2 ppmw and preferably <1 ppmw) or more specifically low levels of ash (measured by ASTM D482-03 or ISO 6245:2001) can be tolerated in the reactor feeds. Nonvolatiles are generally determined in accordance with ASTM D6560.

Various techniques have been employed for treating petroleum hydrocarbon feeds for the removal of nonvolatiles contained therein to render cost advantaged feeds suitable for conventional steam cracker feeds. These processes tend to improve the quality of hydrocarbon feeds containing nonvolatiles for conventional steam cracking. However, in most instances the processes suffer from operating condition limitations, space limitations for retrofits, high capital costs, and high operating costs, due to the processing steps used, high capital expense of the required equipment, and/or unsatisfactory reduction limitations in the amount of nonvolatiles removed from the feeds. For example, it may be quite costly to equip each of several steam cracking furnaces in a steam cracking complex with all of the equipment necessary to process the low cost feedstocks to provide an acceptable, nonvolatile-free feed into the cracking section of each steam cracker. Similar and even exaggerated problems exist for a regenerative pyrolysis reactor complex, due to their feed quality requirements and increased temperature severity.

The present invention provides a revolutionary process for improving the quality of nonvolatile-containing hydrocarbon feedstocks to render such feed suitable for use as a feedstream to a regenerative pyrolysis reactor system. The invention provides a commercially useful and cost effective technique for removing the ash-forming nonvolatiles from the feedstock before the feedstock undergoes pyrolysis in a regenerative pyrolysis reactor.

SUMMARY OF THE INVENTION

The present invention relates to pyrolysis of hydrocarbons and in one embodiment includes a process for reducing ash formation due to pyrolyzing a hydrocarbon feedstock containing nonvolatiles, in a regenerative pyrolysis reactor system. In one aspect, the inventive process comprises a process for pyrolyzing a hydrocarbon feedstock containing nonvolatiles and reducing ash formation from such process, in a regenerative pyrolysis reactor system, the process comprising: (a) heating the nonvolatile-containing hydrocarbon feedstock upstream of a regenerative pyrolysis reactor system to a temperature sufficient to form a vapor phase and a liquid phase containing the nonvolatiles; (b) separating said vapor phase from said liquid phase; (c) transferring or feeding at least a portion of the separated vapor phase to the regenerative pyrolysis reactor system; and (d) converting (e.g., cracking) at least a portion of the separated vapor phase in the regenerative pyrolysis reactor system to form a pyrolysis product. Preferably, the separated vapor phase is substantially free of nonvolatiles when such vapor phase is fed to the reactor system. Also, it may be preferable that the regenerative reactor system is a reverse flow type of regenerative reactor system. In another embodiment, the pyrolysis reactor system comprises at least two pyrolysis reactor systems and the separated vapor is cracked in at least two of such pyrolysis reactor systems. The separated vapor is transferred to and cracked in a reactor system, preferably in at least two reactor systems substantially simultaneously by feeding the vapor in parallel flow (e.g., substantially simultaneously) to the at least two reactor systems.

In another embodiment, the invention includes the step of feeding a diluent or stripping agent, such as hydrogen, to the pyrolysis reactor system in conjunction with the separated vapor phase to the pyrolysis reactor system for cracking the vapor phase in the presence of the diluent or stripping agent, within the regenerative pyrolysis reactor system. Hydrogen may typically be a preferred diluent or stripping agent. Steam may be used as a diluent or stripping agent for some alternative processes. However, steam may not be preferred in many processes, in that, unlike steam cracking, at pyrolysis reactor temperatures, such as above 1200° C., steam can react with hydrocarbon to form carbon monoxide and hydrogen.

In yet another aspect, the invention comprises an inventive process for the manufacture of a cracked hydrocarbon product, such as olefins, aromatics, and/or acetylene, from the hydrocarbon feed using a reverse-flow type regenerative pyrolysis reactor system, wherein the reactor system includes (i) a first reactor comprising a first end and a second end, and (ii) a second reactor comprising primary end and a secondary end, the first and second reactors oriented in a series flow relationship with respect to each other such that the secondary end of the second reactor is proximate the second end of the first reactor. In one aspect, the inventive process comprises the steps of: (a) heating a nonvolatile-containing hydrocarbon feedstock upstream of the regenerative pyrolysis reactor system to a temperature sufficient to form a vapor phase that is essentially free of nonvolatiles and a liquid phase containing the nonvolatiles; (b) separating the vapor phase from the liquid phase; (c) supplying a first reactant through a first channel in the first reactor and supplying at least a second reactant through a second channel in the first reactor, such that the first and second reactants are supplied to the first reactor from the first end of the first reactor; (d) combining the first and second reactants at the second end of the first reactor and reacting the combined reactants to produce a heated reaction product; (e) passing the heated reaction product through the second reactor to transfer at least a portion of the heat from the reaction product to the second reactor to produce a heated second reactor; (f) transferring at least a portion of the separated vapor phase from step (b) as a hydrocarbon feed, and optionally a diluent or stripping agent, to the pyrolysis reactor system and through the heated second reactor to the first reactor, to convert at least a portion of the separated vapor phase feed into a pyrolysis hydrocarbon product; (g) quenching the pyrolysis product in the first reactor; and (h) recovering the quenched pyrolysis product from the reactor system.

In another aspect, the present invention further comprises condensing the separated vapor phase that is essentially free of nonvolatiles, storing the condensed hydrocarbons, and subsequently using the condensed hydrocarbons as feed to a regenerative pyrolysis reactor system.

BRIEF DESCRIPTION OF THE DRAWINGS

FIG. 3 illustrates an axial view of an exemplary gas distributor.

FIG. 4 illustrates a cross sectional view of an exemplary gas/vapor mixer and channels for controlled combustion.

FIG. 4a is a cutout view of a portion of FIG. 4.

DETAILED DESCRIPTION

The terms "convert" and "converting" are defined broadly herein to include any molecular decomposition, cracking, breaking apart, conversion, and/or reformation of organic molecules in the hydrocarbon feed, by means of at least pyrolysis heat, and may optionally include supplementation by one or more of catalysis, hydrogenation, diluents, and/or stripping agents.

As used herein, the expression "essentially free of nonvolatiles" means that concentration of nonvolatiles in the vapor phase is reduced to an extremely low level. Those skilled in the art know that it is difficult to obtain a complete separation of nonvolatiles from a hydrocarbon feedstock such as crude oil. As a result, the vapor phase may contain a trace amount of nonvolatiles. Therefore, in the context of the present invention, while it is the objective that the vapor phase contains no nonvolatiles, it is recognized that the vapor phase may contain an acceptable trace amount of nonvolatiles, e.g., typically an amount of 2 ppmw or less, but still be considered essentially free of nonvolatiles. The separated vapor phase preferably contains less than 1 ppmw of nonvolatiles. More preferably, the vapor phase contains less than 0.5 ppmw of nonvolatiles. Variables such as the pyrolysis conditions and reactor design will dictate an appropriate threshold cutoff for nonvolatile carryover in the vapor phase, for a specific application.

Figure 5:
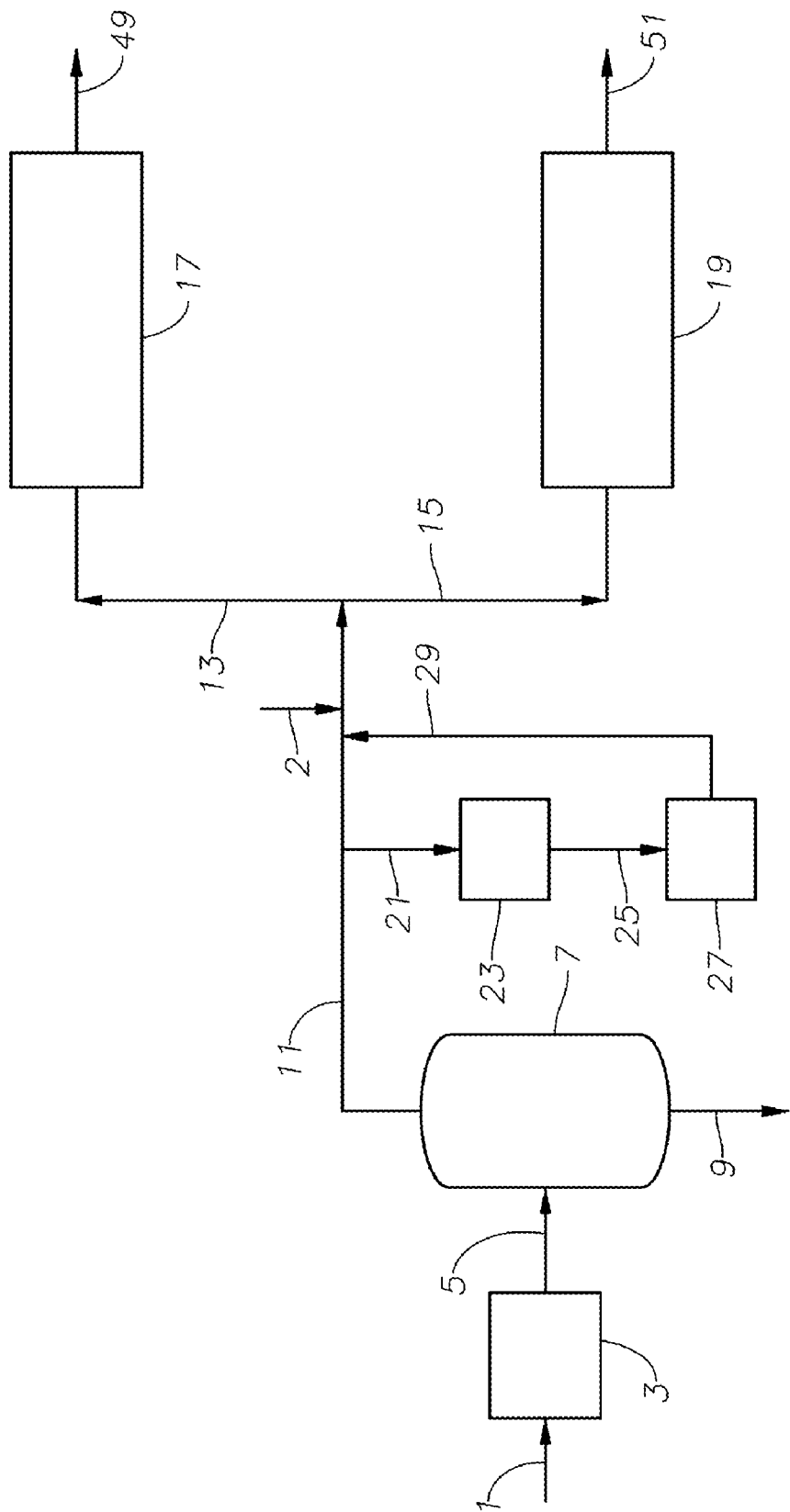
FIG. 5 is a simplified process flow diagram illustrating an embodiment of the invention.

FIG. 5, illustrates a simplified schematic flow diagram of a non-limiting embodiment of the invention, including feeding or transferring a hydrocarbon feedstock that contains nonvolatile components therein via inlet line (1) to a heat unit/zone (3). Preferred diluent to hydrocarbon feed molar ratios may range from about 1:1 to about 5:1. Upon entering the heated, pyrolysis reaction section of the reactor system, e.g., entering the region of the reactor where the pyrolysis reaction chemistry or conversion occurs. Stated differently, the amount of diluent added to the hydrocarbon feedstock or to the separated vapor phase preferably results in a diluent to separated vapor phase molar ratio of from about 1:1 to about 5:1. Substantially any hydrocarbon feedstock containing a mixture of both volatiles and nonvolatiles can advantageously be utilized in the process. Examples of such feedstock include one or more of steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, naphtha, crude oil, atmospheric pipestill bottoms, vacuum pipestill streams including bottoms, virgin naphtha, wide boiling range naphthas, heavy non-virgin hydrocarbon streams from refineries, vacuum gas oil, heavy gas oil, naphtha contaminated with crude, atmospheric resid, heavy residuum, $C_4$'s/residue admixture, condensate, contaminated condensate, naphtha residue admixture and mixtures thereof. The hydrocarbon feedstock may have a nominal end boiling point of at least 400° F. (200° C.), (e.g., greater than or equal to 400° F. (200° C.), such as in excess of 1200° F. (650° C.) and even in excess of 1500° F. (815° C.)) and will commonly have a nominal end boiling point of at least 500° F. (260° C.). Some preferred hydrocarbon feedstocks include crude oil, atmospheric resids, contaminated condensate, and gas oil distillates, tars, fuel oils and cycle oils. The vaporized hydrocarbon feed may include as a co-feed, substantially any other hydrocarbon material that undergoes the endothermic reforming, such as to acetylene, including natural gas mixtures, other petroleum alkanes, petroleum distillates, kerosene, jet fuel, fuel oil, heating oil, diesel fuel and gas oil, gasoline, and alcohols. One preferred co-feed may be a hydrocarbon component that may function as a hydrogen donor diluent, such as tetralin, and dihydroanthracene, hydropyrene, and hydrotreated steam cracked tar oils. Preferably, the co-feed will be in a vapor or gaseous state at the temperature and pressure of introduction into the reactor system.

Hydrocarbon streams that have been processed through a refinery, e.g., naphtha, gas oils, etc., may be suitable reactor feeds. The inventive process will cleanse the feeds if the same become contaminated with ash-forming components in their transport to the pyrolysis facility. However, use of typical light refiner streams may limit the attractiveness of the process due to the relatively high cost of the feeds, as compared to other heavier feeds. Heavier, more aromatic feeds are typically lower cost, per unit weight, but may yield lower acetylene and ethylene yields and higher carbon or tar yields. Due to the high aromatic content of the heavier feeds, the feeds have lower hydrogen content and during pyrolysis, the hydrogen deficit feeds may form tar, coke, or soot. Conversion in the presence of hydrogen diluent or hydrogen donor co-feed will provide additional hydrogen available in the reformer to facilitate better conversion of the separated vapor phase from the heavier portion of the heavy feeds.

The amount of nonvolatiles present in the hydrocarbon feedstock will vary depending upon the feedstock source and quality. For example, contaminates, full range vacuum gas oils, and petroleum crude oils often contain relatively high levels of nonvolatile molecules, for example, up to 20 percent by weight of nonvolatiles. Other feedstocks may contain even higher concentrations of nonvolatiles. A typical hydrocarbon feedstock used in the process of the present invention may contain nonvolatiles in an amount of from about 5 to about 40 weight percent based upon the weight of the total hydrocarbon feed.

In heat unit (3), the hydrocarbon feedstock is heated to a temperature that is sufficient to form a vapor phase and a liquid phase. The heating of the hydrocarbon feedstock is not limited to any particular technique. For example, the heating can be conducted by means such as but not limited to, a heat exchanger, steam injection, submerged heat coil, or a fired heater. In some embodiments, the heat unit may be a separate unit, such as illustrated by element (3) in FIG. 5, and in other embodiments the heat unit may be integrated with or internal to separation unit (7). The temperature to which the hydrocarbon feedstock is heated will vary depending upon composition of the hydrocarbon feedstock and the desired cut-off point for distinguishing between the vaporized fraction and the liquid fraction. Commonly, the nonvolatile-containing hydrocarbon feedstock is heated to a temperature at which at least 50 percent of the liquid phase hydrocarbon feedstock is converted to a vapor phase, preferably greater than about 90 weight percent and more preferably greater than 98 weight percent of the feedstock is vaporized. Exemplary separation vessel temperatures may range from about 400° F. to about 1200° F. (200° C. to 650° C.). Preferably, the hydrocarbon feedstock is heated to a temperature from about 450° F. to about 1000° F. (230° C. to 540° C.), and more preferably from about 500° F. to about 950° F. (260 to 510° C.). Since the nonvolatiles contained in the hydrocarbon feedstock are essentially nonvolatile, they remain within the nonvolatized liquid phase. The fraction of nonvolatiles in each of the vapor/liquid phases is a function of both the hydrocarbon partial pressure and the temperature to which the hydrocarbon feedstock is heated. Desirably, about 50 to about 98 percent by weight of the heated feedstock will be in the vapor phase. Still more preferably, at least 90 weight percent of the feedstock will be volatized into the vapor phase. Vaporizing substantially all of the feedstock may become more difficult with heavier feedstocks. For identification purposes, the vaporized or volatized fraction of the separated feed stream may be referred to herein as the separated vapor phase, even if such fraction is wholly or fully condensed, partially cooled or condensed, stored, and/or later revaporized, prior to feeding into the pyrolysis furnace. Preferably the separated vapor phase is fed to the pyrolysis furnace in a vapor/gas phase.

Referring still to FIG. 5, for embodiments having an external or separate heat and separation units, the heated feedstock is transferred via line (5) to a separation unit (7), where the vapor phase is separated from the liquid phase. For integrated or internal heat units, the vapor phase is separated from the liquid phase in a vapor-liquid separation unit. Examples of equipment suitable for separating the vapor phase from the liquid phase include knock-out drum (e.g., substantially any vapor-liquid separator), a flash drum, two-phase separator, distillation unit, flash drum having a heating means within the drum, a knock-out drum having heating means within the known-out drum, and combinations thereof.

Exemplary heating means may include direct fired heaters, steam, convection heating, heat exchangers, radiant heating, electric-resistance heating, or other heat source. In many embodiments, it may be important to affect the feed stream separation step so that the vapor phase is essentially free of nonvolatiles (e.g., having less than 1 weight percent of nonvolatiles carried into the separated vapor phase, based upon the total weight of the separated vapor phase, determined substantially at or near the vapor phase exit of the separation vessel.). Otherwise, the nonvolatiles entrained in the vapor phase will be carried into the pyrolysis reactor and may cause coking and/or ash problems.

Heat unit (3) and separation unit (7) are located upstream with respect to the pyrolysis reactor system. Upstream merely means that the hydrocarbon feed is first separated into vapor and liquid phases, and then the vapor phase is transferred to the pyrolysis reactors. There may also be intermediate steps or processes, such as, for example, introducing hydrogen into the vapor phase and/or hydrogenation of the vapor phase before cracking Although the heat unit and separation unit are depicted in FIG. 5 as separate units, they can be combined into a single unit ("heat/separation unit"). Examples of suitable heat/separation units include distillation towers, fractionators, and visbreakers, as well as knock-out drums and flash drums having a means within the drum for heating the hydrocarbon feedstock. Examples of suitable techniques for heating of the hydrocarbon feedstock contained within the heat/separation unit include injecting hydrogen into the hydrocarbon feedstock present in the heat/separation unit, heating in a hydrogenation unit/process, and heaters immersed into the liquid hydrocarbon feedstock present in the heat/separation unit. Additionally and preferably, fired heaters may be used to heat the hydrocarbon feedstock. Heating of the nonvolatile-containing hydrocarbon feedstock may be carried out such as by fired heater, heat exchanger (either internal or external, including but not limited to conventional heat exchangers, submerged internal coils or elements, convection or radiant heating, induction heating, and/or heat from the reaction system), steam injection, and/or combinations thereof. Although the heat unit (3) and separation unit (7) are each shown in FIG. 5 as respective single and separate units, each of these units can alternatively comprise a plurality of units, e.g., a separation unit can include more than one knock-out drums, separators, and/or flash drums. As discussed below, the heat unit (3) and separation unit (7) may also be combined or integrated into substantially a common unit.

For some process embodiments, it may be preferred to maintain a determined constant ratio of vapor to liquid within the separation unit (7) or, as the case may be, the heat/separation unit, but such ratio is difficult to measure and control. However, the temperature of the heated feedstock before separation can be used as an indirect parameter to measure, control, and maintain an approximately constant vapor to liquid ratio in the unit. Ideally, the higher the feedstock temperature, the higher percentage of hydrocarbons that will be vaporized and become available as part of the vapor phase for cracking. However, when the feedstock temperature is too high, nonvolatiles such as coke precursors could be present in the vapor phase and carried over to the convection reactor tubes, eventually coking and/or ashing the tubes. The hydrogen diluent, however, will help suppress coke precursor formation or at least make it palatable, since the additional free hydrogen produced in the reactor will facilitate burning off the coke in the reactor. Ashing in the reactor, however, should still be avoided. A primary objective of the feed separation step is to remove ashing precursors.

Conversely, if the temperature of the heated feedstock is too low, this can result in a low ratio of vapor to liquid with more volatile hydrocarbons remaining in the liquid phase and not be available for cracking Adding the hydrogen diluent to the separator and/or the pyrolysis reactor permits raising the temperature of the separation step and vessel, as compared to a separation step in the absence of hydrogen. Thereby, feeding methane or other co-feed and optionally hydrogen diluent or hydrogen donor diluent, into the separator may even further enable volatizing a higher percentage of the hydrocarbon feed without formation of unmanageable ash/coke precursors, as compared to the absence of hydrogen diluent with the feed.

The maximum separation temperature of the heated feedstock may also depend upon the composition of the hydrocarbon feedstock. If the feedstock contains higher amounts of lighter hydrocarbons, the separation temperature of the feedstock may be lower while vaporizing an acceptable percentage of the feed. If the feedstock contains a higher amount of less-volatile or higher boiling point hydrocarbons, the temperature of the feedstock may be heated to a higher value for separation, but may also need the hydrogen diluent. For example, with respect to vacuum gas oil feeds, the temperature of the heated feedstream may typically be maintained in the range of from about 400° F. (200° C.) to about 1200° F. (650° C.).

In addition to temperature, it is usually also desirable to maintain a substantially constant hydrocarbon partial pressure to maintain a substantially constant ratio of vapor to liquid in the separation vessel. Typically, the hydrocarbon partial pressures for the heated feedstream are dependent upon the amount of hydrogen or other stripping agent present in or mixed with the feed. In one aspect of the inventive process, it may be preferred to combine the co-feed with the hydrocarbon feed stream either upstream of the separation step or directly into the separation step. Similarly, hydrogen, or hydrogen donor diluent may also be added to the hydrocarbon stream upstream of or in the separation step. The co-feed diluent stream may assist improved vaporization and separation of the hydrocarbon feed in the heated separation step. Additional diluent may separately or additionally be added to the separated vapor stream and/or directly into the pyrolysis reactor.

The amount of vapor phase produced in the separation step can vary widely, depending upon the application and feedstock input rate. For example, in some applications the vapor phase flow rate may be a vapor flow rate that has only a partial pyrolysis reactor load, while in other applications, the vapor flow rate may simultaneously load a plurality (two or more) of pyrolysis reactors. Still further, in some applications the vapor phase flow rate may exceed the reactor(s) load capacity for a particular installation, whereby the excess vapor cut may be condensed and stored for subsequent use in either steam cracking and/or as pyrolysis reactor feed, or sent to other applications or uses. For example, the condensed material can be stored for at least a day, week, or even longer, such as in tanks or other storage vessels, or sent as feed to other processes. The determination of total pyrolysis reactor load capacity is determinable by persons skilled in the processing art. For example, total load capacity may be calculated from the heat requirements, flow capacity, reaction requirements, etc. Pyrolysis capacity is sometimes limited by the heat output capabilities of the reactor and efficiency with which that heat is utilized and moved through the reactor system. In some embodiments, the inventive process includes using multiple pyrolysis reactors, such as at least two pyrolysis reactor systems, including at least a first pyrolysis reactor system, and the amount of separated vapor phase is in excess of the reactor capacity of the first pyrolysis reactor system. Thereby, additional reactors may be used to handle the total capacity of the transferred vapor phase feed for pyrolysis. For example, a single heater-separator system may feed two or more reactor systems, such as a bank of reactor systems.

Referring still to FIG. 5, the nonvolatile-containing liquid phase may be withdrawn or removed from separation zone (7) as a bottoms stream, such as via line (9). This material can be sold as fuel oil or further processed, e.g., subjected to fluidized catalytic cracking (FCC), coking, or PDX to produce higher value products, etc. The liquid phase may also contain resins in addition to nonvolatiles. Resins differ from the nonvolatiles primarily in having lower molecular weight, less polynuclear aromatics, more solubility in aliphatic hydrocarbons, and lower in metal content.

The separated vapor phase may be withdrawn from separation unit (7) as an overhead stream via line (11) and passed to one or a plurality (two or more) of pyrolysis reactors, such as illustrated FIG. 5, depicting two reactors as pyrolysis reactor systems (17) and (19). The separated, vaporized hydrocarbons may include various concentrations of associated gases, such as ethane and other alkanes. The vaporized fraction may also include impurities, such as H2S and/or nitrogen, and may be sweetened before feeding to the reactor system. Although two pyrolysis reactors are illustrated, three or more pyrolysis reactors also may be used in some applications. Alternatively, the vapor phase essentially free of nonvolatiles can be removed via line (21), cooled to a liquid in cooling unit (23), and then transferred via line (25) to storage unit (27). Although the cooling unit and storage unit are each depicted in FIG. 5 as separate units, in other applications they may comprise a common (e.g., substantially integrated or combined) heat-separator unit. A common heater-separator unit may include, for example, one or more of a distillation column, a flash drum having a heating means within the drum, a knock-out drum having a heating means within the knock-out drum, and combinations thereof. Some installations may also include a plurality of common units to serve one or more reactor systems.

Also, each of the cooling and unit and/or the storage unit may comprise one or more of such respective unit, e.g., storage unit can comprise a plurality of tanks The liquid (or a portion thereof) can be transferred from storage unit (27) via line (29) to line (11) and then passed or transferred in substantially parallel flow, such as via lines (13) and (15), to pyrolysis reactors (17) and (19). The cracked reaction product may then be transferred to product-separation processes, such as via outlet lines (49) and (51).

As illustrated in exemplary FIG. 5, the vaporized phase or cut from the separation in the separating unit (7) (either with or without interim storage (27)), may be transferred such as via feed line (11) to one or more pyrolysis reactor systems, such as illustrated by reactor systems (17) and (19), such as via lines (13) and (15). The separated vapor phase feed through lines (13) and/or (15) is introduced into the respective reactor system(s) and heated to a temperature sufficient for conversion or cracking of the vapor stream to a mix of higher value hydrocarbons, such as acetylenes.

According to a preferred process, the separated vapor feed are exposed to the previously heated hot spot or reaction zone within the reactor system for a determined appropriate residence time (typically less than 1.0 second, commonly less than 0.5 seconds, and often less than 0.1 seconds, while a preferred range of 1-100 ms is preferred) and then quenched to stop the reaction to provide the desired selectivity to a preferred hydrocarbon product mix or pyrolysis product within the cracked product stream. Longer reaction times tend to favor the formation of coke. In many preferred applications, the reaction will be allowed to proceed for sufficient time to crack the vapor phase hydrocarbons into smaller components, such as breaking the alkyls to methyl groups (e.g., $CH_4$, $CH_3$, and $CH_2$) and hydride radicals. At least a portion of the introduced or intermediately produced methane or methyl radicals are converted to acetylene in the reactor system. Aromatic molecules may similarly be converted to acetylenes or diacetylenes radicals. A methane co-feed may further help form hydride radicals, which may help suppress coke and help the reaction proceed to formation of acetylene. A typical preferred process may also include a relatively high selectivity ($\geq 0$ weight percent) for acetylene within the final cracked product stream mix. Other exemplary products that may result from a preferred process may include hydrogen and methane, along with some other components such as residual coke. Some components of the vaporized feed stream may be converted within the reactor system, directly to acetylene. For example, in a high severity regenerative reactor, the high temperature will start breaking carbons or methyl radicals off of aliphatic or nonaromatic chains, while the aromatics within the feed may be reformed directly to acetylenes or diacetylenes. Preferably, sufficient quenching occurs within the reactor system such that separate additional quench steps (e.g., heat exchangers, etc.) are not required to stop the conversion from running beyond the production of a high selectivity to acetylene. The cracked product mix may include gaseous hydrocarbons of great variety, e.g., from methane to coke, and may include saturated, monounsaturated, polyunsaturated, and aromatics. In some aspects, the pyrolysis product produced is a dilute acetylene stream (primarily acetylene, with some hydrogen and unreacted methane) that can be easily hydrogenated to an olefin, such as ethylene, in the vapor phase or liquid phase. The acetylene hydrogenation reactor could be, for example, a standard fixed bed process using known hydroprocessing catalyst.

In another exemplary process, a vaporized stream from the separation process may comprise a mix of hydrocarbons, such as aliphatic, naphthenic, and aromatic compounds. Such vapor stream may be condensed and stored for later feeding to a regenerative reactor system or fed to the reactor system without substantially going through an intermediate condensation step. The regenerative reactor may be heated according to a regeneration process whereby exothermically reacting components, such as fuel and oxidant are introduced and reacted in the reactor to heat the reactor media, with the resulting reaction product removed from the reactor. Then the vaporized feed may be introduced into or passed through the heated zone within the reactor.

Typical conditions may include a residence time from 0.001 to 1.0 seconds and may typically include, for example, a pressure from about 5 to 50 psia (34 to 345 kPa). In some embodiments, the reactor conditions may be at a vacuum pressure, such as less than 15 psia (103 kPa). Cracked pyrolysis product may be removed from the reactor system, such as via lines 49 and/or 51 and transferred to other processes for recovery of the various component products of the cracked product. The reactor system may also include additional feed lines (not shown) such as fuel and oxidant feed, stripping agent feed, exhaust lines, etc.

The regenerative pyrolysis reactor system according to this invention is generally a higher temperature hydrocarbon pyrolysis reactor system than typical steam cracking type hydrocarbon systems that are conventionally used in commercial steam cracking operations. For example, commercial naphtha steam cracking operations typically operate at furnace radiant coil outlet temperatures of less than about 815° C. (1500° F.). However, the terms "regenerative pyrolysis reactor systems" as pertaining to the subject invention refers to cyclical (regenerating) thermal hydrocarbon pyrolysis systems that heat the hydrocarbon stream to be converted (e.g., the separated vapor phase) to temperatures of at least 1200° C. (2192° F.), preferably in excess of 1500° C. (2732° F.), or for some applications, more preferably in excess of 1700° C. (3092° F.). In some reactions, it may even be preferable to heat the feeds for very short time duration, such as less than 0.1 seconds, to a temperature in excess of 2000° C. (3632° F.). An exemplary preferred process may pyrolyze the feed stream within the reactor, such as at temperatures of from about 1500 to about 1900° C., and more preferably from about 1600 to about 1700° C. Exemplary residency times preferably may be short, such as less than 0.1 seconds and preferably less than about 5 milliseconds. In some aspects, the conversion or cracking of the separated vapor phase may be performed in the presence of hydrogen, hydride, other hydrocarbons, and/or other diluents or stripping agents. The conversion of the vapor fraction into higher value hydrocarbons such as acetylene typically requires a high reformation temperature, which in the past has been a significant barrier to commercialization and efficiency.

At least part of the invention of the present inventors is the recognition that the requisite high temperature may be achieved by creating a high-temperature heat bubble in the middle of a packed bed system. This heat bubble may be created via a two-step process wherein heat is (1) added to the reactor bed via delayed, in-situ combustion, and then (2) removed from the bed via in-situ endothermic reforming. A key benefit of the invention is the ability to consistently manage and confine the high temperature bubble (e.g., >1600° C.) in a reactor region(s) that can tolerate such conditions long term. The inventive process provides for a substantially continuously operating, large-scale, cyclic, regenerative reactor system that is useful and operable on a commercial scale, thereby overcoming the limitations of the prior art.

Figure 1A:
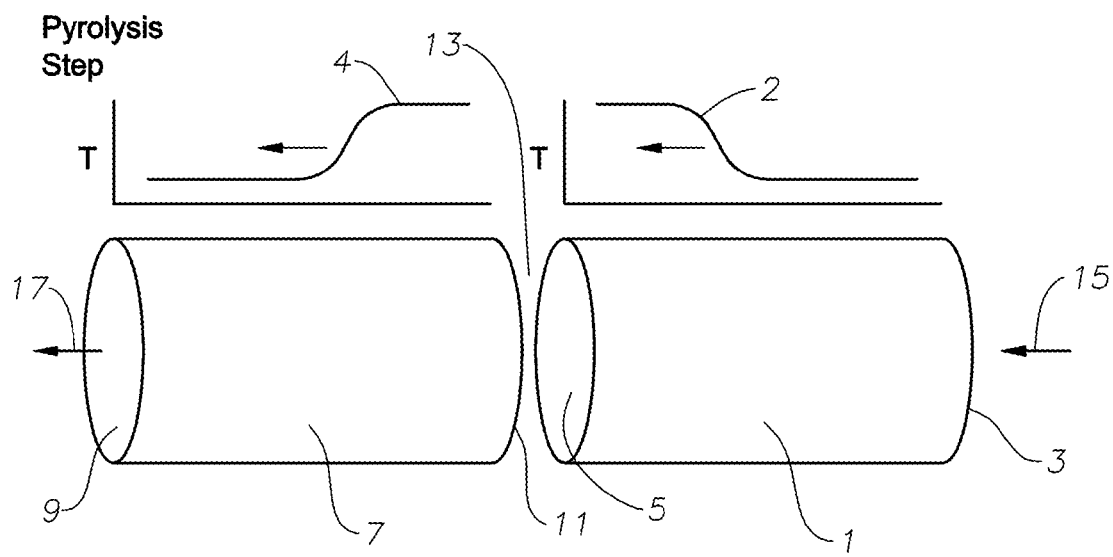
FIGS. 1(a) and 1(b) are a simplified, diagrammatic illustration of the two steps in a regenerating reverse flow pyrolysis reactor system according to the present invention.
Figure 1B:
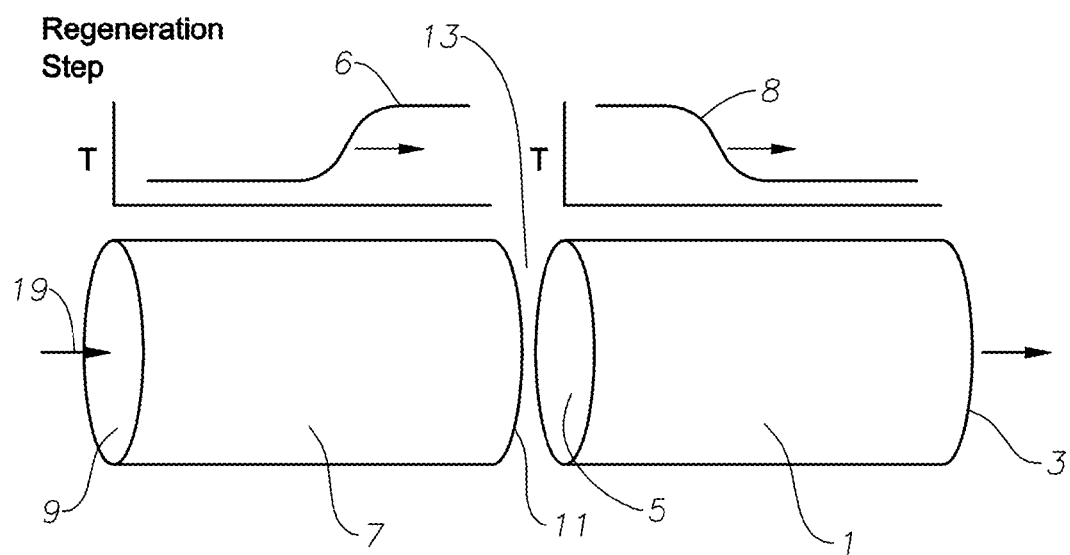

A regenerative reactor system or process may be described generally as hydrocarbon pyrolysis in a regenerative reactor or more specifically the conversion of a volatized hydrocarbon stream to acetylene or other pyrolysis product via thermal pyrolysis of the hydrocarbons in a regenerative reactor system. One exemplary regenerative pyrolysis reactor system includes first and second reactors and comprises a reverse flow type of regenerative pyrolysis reactor system, such as illustrated in FIGS. 1(a) and 1(b). In one preferred arrangement, the first and second reactors may be oriented in a series flow relationship with each other, with respect to a common flow path, and more preferably along a common center axis. The common axis may be horizontal, vertical, or otherwise. A regenerative pyrolysis reactor is a cyclical reactor whereby in a first part of the cycle materials may flow and react for a period of time in one direction through the reactor, such as to generate and transfer heat to the reactor media, and then in a second part of the cycle the same and/or other materials may be fed through the reactor to react in response to the heat and thereby produce a pyrolysis product. In a reverse flow type of regenerative pyrolysis reactor, during the second portion of the cycle the materials flow in an opposite direction as compared to the direction of material flow in the first portion of the cycle. The regenerative pyrolysis reactor system contains a reaction zone that includes the heated or hot area of the reactor where the majority of the high temperature reaction chemistry takes place, and a quenching zone that serves to absorb heat from the reacted product and thereby halt the reaction process or chemistry by cooling the reaction product. At least a portion of the separated vapor feed that is transferred to or fed into the reactor system is, generally, (i) cracked in the reaction zone to form the pyrolysis product, and (ii) that cracked reaction product is timely quenched in the quenching zone to stop the reaction at the desired pyrolysis product step to thereby yield the pyrolysis product. If the reaction is not timely quenched, the reaction may continue breaking the molecules into either coke, their elemental components, or less desirable product components.

The present invention includes a process wherein first and second in-situ combustion reactants are both separately, but preferably substantially simultaneously, passed through a quenching reactor bed (e.g., a first reactor bed), via substantially independent flow paths (channels), to obtain the quenching (cooling) benefits of the total combined weight of the first and second reactants. (Although only first and second reactants are discussed, the regeneration reaction may also include additional reactants and reactant flow channels.) Both reactants are also concurrently heated by the hot quench bed, before they reach a designated location within the reactor system and react with each other in an exothermic reaction zone (e.g., a combustion zone). This deferred combustion of the first and second reactants permits positioning initiation of the exothermic regeneration reaction, in-situ, at the desired location within the reactor system.

The reactants are permitted to combine or mix in the reaction zone to combust therein, in-situ, and create a high temperature zone or heat bubble (e.g., 1500-1700° C.) inside of the reactor system. Preferably the combining is enhanced by a reactant mixer that mixes the reactants to facilitate substantially complete combustion/reaction at the desired location, with the mixer preferably located between the first and second reactors. The combustion process takes place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to avoid waste of heat and overheating the second reactor. The flue gas may be exhausted through the second reactor, but preferably most of the heat is retained within the second reactor. The amount of heat displaced into the second reactor during the regeneration step is also limited or determined by the desired exposure time or space velocity that the volatized hydrocarbon feed gas will have to the reforming, high temperature second reactor media to convert the volatized hydrocarbon and other hydrocarbons to acetylene.

After regeneration or heating the second reactor media, in the next/reverse step or cycle, the volatized hydrocarbon cut from the previously discussed separation step are fed or flowed through the second reactor, preferably from the direction opposite the direction of flow during the heating step. The volatized hydrocarbons contact the hot second reactor and mixer media, in the heat bubble region, to transfer the heat to the volatized hydrocarbon for reaction energy. In addition to not wasting heat, substantially overheating the reformer/second reactor bed may adversely lead to a prolonged reaction that cracks the hydrocarbons past the acetylene-generation point, breaking it down into its elemental components. Thus, the total amount of heat added to the bed during the regeneration step should not exceed the sum of the heats that are required (a) to sustain the reforming reaction for the endothermic conversion of the supplied hydrocarbon to acetylene for a suitable period of time, as determined by many factors, such as reactor size, dimensions, vapor flow rates, temperatures used, desired contact time, cycle duration, etc, and (b) for heat losses from the system both as conduction losses through reactor walls as well as convective losses with the exiting products. The total amount of heat stored in the reactor system though is generally much more heat than would be minimally needed for conversion on any single cycle. However, it is desirable to avoid having the temperature bubble so large that the residence time at temperature becomes too long. As is commonly done for reactor systems, normal experimentation and refining adjustments and measurements can be made to the reactor system to obtain the optimum set of reactor conditions.

In preferred embodiments, the reactor system may be described as comprising two zones/reactors: (1) a heat recuperating (first) zone/reactor, and (2) a reforming (second) zone/reactor. As a catalyst is preferably not required to facilitate reforming the hydrocarbon vapor to acetylene, so in most preferred embodiments, no catalyst is present in the reactor beds. However, there may be some applications that benefit from the presence of a catalyst to achieve a certain range of reforming performance and such embodiments are within the scope of the invention.

The basic two-step asymmetric cycle of a regenerative bed reactor system is depicted in FIGS. 1a and 1b in terms of a reactor system having two zones/reactors; a first or recuperator/quenching zone (7) and a second or reaction/reforming zone (1). Both the reaction zone (1) and the recuperator zone (7) contain regenerative beds. Regenerative beds, as used herein, comprise materials that are effective in storing and transferring heat. The term regenerative reactor bed(s) means a regenerative bed that may also be used for carrying out a chemical reaction. The regenerative beds may comprise bedding or packing material such as glass or ceramic beads or spheres, metal beads or spheres, ceramic (including zirconia) or metal honeycomb materials, ceramic tubes, extruded monoliths, and the like, provided they are competent to maintain integrity, functionality, and withstand long term exposure to temperatures in excess of 1200° C. (2192° F.), preferably in excess of 1500° C. (2732° F.), more preferably in excess of 1700° C. (3092° F.), and even more preferably in excess of 2000° C. (3632° F.) for operating margin.

As shown in FIG. 1a, at the beginning of the "reaction" step of the cycle, a secondary end (5) of the reaction zone (1) (a.k.a. herein as the reformer or second reactor) is at an elevated temperature as compared to the primary end (3) of the reaction bed (1), and at least a portion (including the first end (9)) of the recuperator or quench zone (7), is at a lower temperature than the reaction zone (1) to provide a quenching effect for the synthesis gas reaction product. A hydrocarbon containing reactant feed, and preferably also a diluent or stripping agent, such as hydrogen or steam, is introduced via a conduit(s) (15), into a primary end (3) of the reforming or reaction zone (1). Thereby, in one preferred embodiment, the term pyrolysis includes hydropyrolysis.

The feed stream from inlet(s) (15) absorbs heat from the reformer bed (1) and endothermically reacts to produce the desired acetylene product. As this step proceeds, a shift in the temperature profile (2), as indicated by the arrow, is created based on the heat transfer properties of the system. When the bed is designed with adequate heat transfer capability, this profile has a relatively sharp temperature gradient, which gradient will move across the reaction zone (1) as the step proceeds. The sharper the temperature gradient profile, the better the reaction may be controlled.

The reaction gas exits the reaction zone (1) through a secondary end (5) at an elevated temperature and passes through the recuperator reactor (7), entering through a second end (11), and exiting at a first end (9) as a synthesized gas comprising acetylene, some unconverted methyls, and hydrogen. The recuperator (7) is initially at a lower temperature than the reaction zone (1). As the synthesized reaction gas passes through the recuperator zone (7), the gas is quenched or cooled to a temperature approaching the temperature of the recuperator zone substantially at the first end (9), which in some embodiments is preferably approximately the same temperature as the regeneration feed introduced via conduit (19) into the recuperator (7) during the second step of the cycle. As the reaction gas is cooled in the recuperator zone (7), a temperature gradient (4) is created in the zone's regenerative bed(s) and moves across the recuperator zone (7) during this step. The quenching heats the recuperator (7), which must be cooled again in the second step to later provide another quenching service and to prevent the size and location of the heat bubble from growing progressively through the quench reactor (7). After quenching, the reaction gas exits the recuperator at (9) via conduit (17) and is processed for separation and recovery of the various components.

The second step of the cycle, referred to as the regeneration step, then begins with reintroduction of the first and second regeneration reactants via conduit(s) (19). The first and second reactants pass separately through hot recuperator (7) toward the second end (11) of the recuperator (7), where they are combined for exothermic reaction or combustion in or near a central region (13) of the reactor system.

The regeneration step is illustrated in FIG. 1b. Regeneration entails transferring recovered sensible heat from the recuperator zone (7) to the reaction zone (1) to thermally regenerate the reaction beds (1) for the subsequent reaction cycle. Regeneration gas/reactants enters recuperator zone (7) such as via conduit(s) (19), and flows through the recuperator zone (7) and into the reaction zone (1). In doing so, the temperature gradients (6) and (8) may move across the beds as illustrated by the arrows on the exemplary graphs in FIG. 1(b), similar to but in opposite directions to the graphs of the temperature gradients developed during the reaction cycle in FIG. 1(a). Fuel and oxidant reactants may combust at a region proximate to the interface (13) of the recuperator zone (7) and the reaction zone (1). The heat recovered from the recuperator zone together with the heat of combustion is transferred to the reaction zone, thermally regenerating the regenerative reaction beds (1) disposed therein.

In a preferred embodiment of the present invention, a first reactant, such as a hydrocarbon fuel, is directed down certain channels (each channel preferably comprising a reactant flow path that includes multiple conduits) in the first reactor bed (7). In one embodiment, the channels include one or more honeycomb monolith type structures. Honeycomb monoliths include extruded porous structures as are generally known in the reaction industry, such as in catalytic converters, etc. The term "honeycomb" is used broadly herein to refer to a porous cross-sectional shape that includes multiple flow paths or conduits through the extruded monolith and is not intended to limit the structure or shape to any particular shape. The honeycomb monolith enables low pressure loss transference while providing contact time and heat transfer. A mixer is preferably used between the zones (e.g., between or within a medium between the first and second reactors) to enable or assist combustion within and/or subsequent to the mixer. Each of the first channel and the second channel is defined broadly to mean the respective conductive conduit(s) or flow path(s) by which one of the reactants and synthesis gas flows through the first reactor bed (7) and may include a single conduit or more preferably and more likely, multiple conduits (e.g., tens, hundreds, or even thousands of substantially parallel conduits or tubes) that receive feed, such as from a gas/vapor distributor nozzle or dedicated reactant port.

The conduits each may have generally any cross-sectional shape, although a generally circular or regular polygon cross-sectional shape may be preferred. Each channel may preferably provide substantially parallel, generally common flow through the reactor media. Thus, a first channel may be merely a single conduit, but more likely will be many conduits, (depending upon reactor size, flow rate, conduit size, etc.), for example, such as exemplified in FIG. 2. A channel preferably includes multiple conduits that each receive and conduct a reactant, such as delivered by a nozzle in a gas distributor. The conduits may be isolated from each other in terms of cross flow along the flow path (e.g. not in fluid communication), or they may be substantially isolated, such that reactant permeation through a conduit wall into the adjacent conduit is substantially inconsequential with respect to reactant flow separation. One preferred reactor embodiment includes multiple segments, whereby each segment includes a first channel and a second channel, such that after exiting the reactor, the respective first reactant is mixed with the respective second reactant in a related mixer segment. Multiple segments are included to provide good heat distribution across the full cross-sectional area of the reactor system.

Referring to FIG. 4, mixer segment (45), for example, may mix the reactant flows from multiple honeycomb monoliths arranged within a particular segment. Each monolith preferably comprises a plurality (more than one) of conduits. The collective group of conduits that transmit the first reactant may be considered the first channel and a particular reactor segment may include multiple collective groups of monoliths and/or conduits conducting the first reactant, whereby the segment comprising a channel for the first reactant. Likewise, the second reactant may also flow through one or more monoliths within a segment, collectively constituting a second channel. Thus, the term "channel" is used broadly to include the conduit(s) or collective group of conduits that conveys at least a first or second reactant. A reactor segment may include only a first and second channel, or multiple channels for multiple flow paths for each of the first and second reactants. A mixer segment (45) may then collect the reactant gas from both or multiple channels. Preferably, a mixer segment (45) will mix the effluent from one first channel and one second channel.

It is recognized that in some preferred embodiments, some or even several of the conduits within a channel will likely convey a mixture of first and second reactants, due at least in part to some mixing at the first end (17) of the first reactor. However, the numbers of conduits conveying combustible mixtures of first and second reactants is sufficiently low such that the majority of the stoichiometrically reactable reactants will not react until after exiting the second end of the first reactor. The axial location of initiation of combustion or exothermic reaction within those conduits conveying a mixture of reactants is controlled by a combination of temperature, time, and fluid dynamics. Fuel and oxygen usually require a temperature-dependent and mixture-dependent autoignition time to combust. Still though, some reaction will likely occur within an axial portion of the conduits conveying a mixture of reactants. However, this reaction is acceptable because the number of conduits having such reaction is sufficiently small that there is only an acceptable or inconsequential level of effect upon the overall heat balance within the reactor. The design details of a particular reactor system should be designed so as to avoid mixing of reactants within the conduits as much as reasonably possible.

The process according to the present invention requires no large pressure swings to cycle the reactants and products through the reactor system. In some preferred embodiments, the reforming or pyrolysis of volatized hydrocarbon step occurs at relatively low pressure, such as less than about 50 psia, while the regeneration step may also be performed at similar pressures, e.g., less than about 50 psia, or at slightly higher, but still relatively low pressures, such as less than about 250 psia. In some preferred embodiments, the volatized hydrocarbon pyrolysis step is performed at a pressure of from about 5 psia to about 45 psia, preferably from about 15 psia to about 35 psia. Ranges from about 7 psia to about 35 psia and from about 15 psia to about 45 psia are also contemplated. The most economical range may be determined without more than routine experimentation by one of ordinary skill in the art in possession of the present disclosure. Pressures higher or lower than that disclosed above may be used, although they may be less efficient. By way of example, if combustion air is obtained from extraction from a gas turbine, it may be preferable for regeneration to be carried out at a pressure of, for example, from about 100 psia to about 250 psia. However, by way of further example, if the process is more economical with air obtained via fans or blowers, the regeneration may be carried out at lower pressures such as 15-45 psia. In one embodiment of the present invention, the pressure of the pyrolysis and regeneration steps are essentially the same, the difference between the pressures of the two steps being less than about 10 psia.

It is understood that some method of flow control (e.g. valves, rotating reactor beds, check valves, louvers, flow restrictors, timing systems, etc.) is used to control gas flow, actuation, timing, and to alternate physical beds between the two flow systems. In the regeneration step, air and fuel must be moved through the reactor system and combined for combustion. Air can be moved such as via compressor, blower, or fan, depending on the operating conditions and position desired for the reactor. If higher pressure air is used, it may be desirable to expand the flue gas through an expansion turbine to recover mechanical energy. In addition, some fraction of exhaust gas may be recycled and mixed with the incoming air. An exhaust gas recycle (EGR) stream may be supplied with at least one of the supplied first reactant and second reactant in the first reactor. This EGR may be used to reduce the oxygen content of the regeneration feed, which can reduce the maximum adiabatic flame temperature of the regeneration feed. In the absence of EGR, $CH_4$/air mixtures have a maximum adiabatic flame temperature of about 1980° C.; $H_2$/air mixtures are about 2175° C. Thus, even if average temperature is controlled by limiting the flow rate of fuel, any poor diluting could result in local hot spots that approach the maximum flame temperature. Use of EGR can reduce the maximum hot spot temperature by effectively increasing the amount of diluent such as $N_2$ (and combustion products) that accompany the oxygen molecules.

For example, when 50 percent excess air is used for combustion, the maximum adiabatic flame temperature for $H_2$-fuel/air combustion decreases from about 3947° F. (2175° C.) to about 2984° F. (1640° C.). Reducing the oxygen content of the supplied air to about 13 percent would make about 2984° F. (1640° C.) the maximum adiabatic flame temperature, regardless of local mixing effects. The reforming or pyrolysis step and flow scheme is illustrated in FIG. 1(a). The vapor phase of the separation of the hydrocarbon feed stream is transferred to the reactor system inlet, preferably mixed with or supplied with hydrogen or a source for hydrogen as a diluent or stripping agent, either within the second reactor or prior to entry into the second reactor, and is pyrolyzed in the high temperature heat bubble created by the regeneration step.

After leaving the second reactor and the optional mixer, the pyrolyzed product stream must be cooled or quenched to halt the conversion process at the acetylene or other appropriate stage. The timing for this step is important because the reaction is not timely and properly quenched, some desired products, such as acetylene, will be passed by the reaction and the pyrolysis product will not have the desired selectivity to the valuable or desired products. Some pyrolysis products, however, are still rarely a desired final material for process export. Rather, a preferred use for the produced pyrolysis products, such as acetylene, is as an intermediate product in a flow process within a chemical plant, in route to other preferred products, such as vinyl esters, ethylene, acetaldehyde, propanal, and/or propanol, acrylic acid, and so on. Typical desired pyrolysis products may be an olefin and/or an alkyne. Some commonly desired olefins may include ethylene, propylene, and/or butylene. Some commonly desired alkynes may include acetylene.

After quenching, the synthesized gas stream may be provided to a separation process that separates the acetylene, methane, hydrogen, and other gases. Recovered methane and hydrogen may be recycled for processing again in the reactor system. Separate process sequences may convert the acetylene to other final products. Each of these products may be further processed to provide yet additional useful products, e.g., acetaldehyde is typically an intermediate in the manufacture of ethanol, acetic acid, butanals, and/or butanols. Ethylene is a basic building block of a plethora of plastics, and may typically be the preferred use for the created acetylene, from the perspective of volume and value. Ethylene is conveniently manufactured from acetylene by hydrogenation. In some embodiments of the invention, it may also be a coproduct of the inventive volatized hydrocarbon conversion process. Another product of high interest is ethanol, which may be conveniently manufactured by first hydrating the acetylene to acetaldehyde and then hydrogenating acetaldehyde to ethanol. Ethanol is of interest because it is easily transported from a remote location and is easily dehydrated to ethylene. Ethanol may also be suitable for use as a motor fuel, if the manufacturing can be sufficiently low in cost.

Conversion of a volatized hydrocarbon stream to acetylene leaves a surplus of hydrogen. An idealized reaction is to crack the aliphatic chains into various methyl groups and continue the pyrolysis reaction via further conversion of the methyls to acetylene. An exemplary reaction for conversion of methane is:

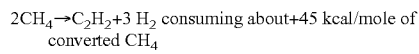
$2CH_4 \rightarrow C_2H_2 + 3\,H_2$ consuming about+45 kcal/mole of converted $CH_4$ As suggested by the above reaction, hydrogen is a valuable by-product of the present process. To a lesser extent, ethylene and propylene are also valuable products, produced as a result of incomplete reduction of volatized hydrocarbon to higher hydrocarbon. Unreacted volatized hydrocarbon is also a valuable product for recovery. Accordingly, separation and recovery of hydrogen, separation and recovery of olefins such as ethylene and propylene, and separation and recovery of unconverted volatized hydrocarbon vapor feed are each individually and collectively preferred steps in the process according to the invention. Unconverted volatized hydrocarbon is preferably returned to the hydropyrolysis reactor so that it may be converted on a second pass. An amount of hydrogen should also be returned to the hydropyrolysis reactor that is sufficient to control the selectivity of the product distribution.

Since hydrogen is created (not consumed) in the reforming pyrolysis reaction, it will be necessary to purge hydrogen from the process. For example, conversion of methane to acetylene, with subsequent hydrogenation to ethylene, will generate about one $H_2$ for every $CH_4$ converted. Hydrogen has a heat of combustion of about 57 Kcal/mole $H_2$, so the hydrogen purged from the process has a heating value that is in the range of what is needed as regeneration fuel. Of course, if there is an alternate, high-value use for the leftover hydrogen, then natural gas could be used for all or part of the regeneration fuel. But the leftover hydrogen is likely to be available at low pressure and may possibly contain methane or other diluents. Thus, use of hydrogen as regeneration fuel may also be an ideal disposition in a remote location. However, heavier feeds may not make as much excess hydrogen, and in some instances may not make any appreciable volumes of excess hydrogen. The amount of excess hydrogen generated will depend strongly on the overall hydrogen to carbon ratio of the feedstock and upon the desired ultimate product. For example, an ethylene product will result in less excess hydrogen than an ethyne (acetylene) product.

Figure 2:
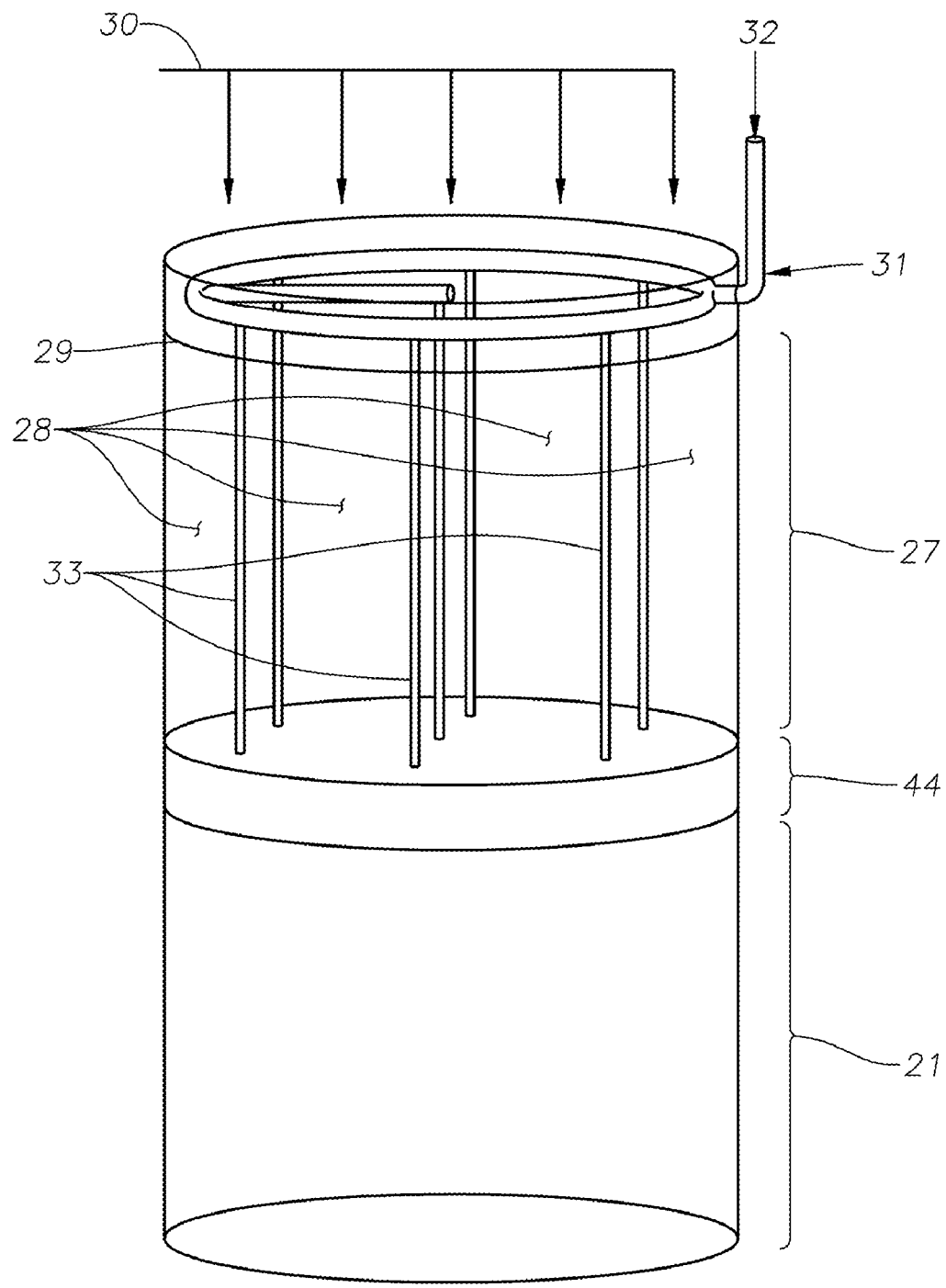
FIG. 2 is another diagrammatic illustration of an exemplary regenerative bed reactor system that defers combustion, controls the location of the exothermic reaction, and adequately quenches the recuperation reactor bed.

FIG. 2 illustrates another exemplary reactor system that may be suitable in some applications for controlling and deferring the combustion of fuel and oxidant to achieve efficient regeneration heat. FIG. 2 depicts a single reactor system, operating in the regeneration cycle. The inventive reactor system preferably comprises two reactors zones or two reactor zones. The recuperator (27) is the zone primarily where quenching takes place and provides substantially isolated flow paths or channels for transferring both of the quenching reaction gases through the reactor media, without incurring combustion until the gases arrive proximate or within the reactor core (13) in FIG. 1. The reformer (2) is the reactor where regeneration heating and volatized hydrocarbon reformation primarily occurs, and may be considered as the second reactor for purposes herein. Although the first and second reactors in the reactor system are identified as separately distinguishable reactors, it is understood and within the scope of the present invention that the first and second reactors may be manufactured, provided, or otherwise combined into a common single reactor bed, whereby the reactor system might be described as comprising merely a single reactor that integrates both cycles within the reactor. The terms "first reactor" and "second reactor" merely refer to the respective zones within the reactor system whereby each of the regeneration, reformation, quenching, etc., steps take place and do not require that separate components be utilized for the two reactors. However, most preferred embodiments will comprise a reactor system whereby the recuperator reactor includes conduits and channels as described herein, and the reformer reactor may similarly possess conduits. Other preferred embodiments may include a reformer reactor bed that is arranged different from and may even include different materials from, the recuperator reactor bed. The bedding arrangement of the reformer or second reactor may be provided as desired or as prescribed by the application and no particular design is required herein of the reformer reactor, as to the performance of the inventive reactor system. Routine experimentation and knowledge of the volatized hydrocarbon pyrolysis art may be used to determine an effective reformer/second reactor design.

As discussed previously, the first reactor or recuperator (27) includes various gas conduits (28) for separately channeling two or more gases following entry into a first end (29) of the recuperator (27) and through the regenerative bed(s) disposed therein. A first gas (30) enters a first end of a plurality of flow conduits (28). In addition to providing a flow channel, the conduits (28) also comprise effective flow barriers (e.g., which effectively function such as conduit walls) to prevent cross flow or mixing between the first and second reactants and maintain a majority of the reactants effectively separated from each other until mixing is permitted. In a preferred embodiment of the present invention, the recuperator is comprised of one or more extruded honeycomb monoliths. A small reactor may include a single monolith, while a larger reactor can include a number of monoliths, while still larger reactor may be substantially filled with an arrangement of many honeycomb monoliths.

Honeycomb monoliths preferred in the present invention (which are adjacent a first end (9) of the first reactor (7)) can be characterized as having open frontal area (or geometric void volume) between about 40 percent and 80 percent, and having conduit density between about 50 and 2000 pores per square inch, more preferably between about 100 and 1000 pores per square inch. (For example, in one embodiment, the conduits may have a diameter of only a few millimeters, and preferably on the order of about one millimeter.) Reactor media components, such as the monoliths or alternative bed media, preferably provide for at least one of the first and second channels and preferably both channels to include a packing with an average wetted surface area per unit volume that ranges from about 50 $ft^{-1}$ to about 3000 $ft^{-1}$, more preferably from about 100 $ft^{-1}$ to 2500 $ft^{-1}$, and still more preferably from about 200 $ft^{-1}$ to 2000 $ft^{-1}$, based upon the volume of the first reactor that is used to convey a reactant. These wetted area values apply to the channels for both of the first and second reactants. These relatively high surface area per unit volume values are likely preferred for many embodiments to aid achieving a relatively quick change in the temperature through the reactor, such as generally illustrated by the relatively steep slopes in the exemplary temperature gradient profile graphs, such as in FIGS. 1(*a*), 1(*b*), and 5. The quick temperature change is preferred to permit relatively quick and consistent quenching of the reaction to prevent the reaction from continuing and creating coke.

Preferred reactor media components also provide for at least one of the first and second channels in the first reactor and more preferably for both channels, to include a packing that includes a high volumetric heat transfer coefficient (e.g., greater than or equal to 0.02 cal/$cm^3 s°$ C., preferably greater than about 0.05 cal/$cm^3 s°$ C., and most preferably greater than 0.10 cal/cm3s° C.), have low resistance to flow (low pressure drop), have operating temperature range consistent with the highest temperatures encountered during regeneration, have high resistance to thermal shock, and have high bulk heat capacity (e.g., at least about 0.10 cal/$cm^{3 °}$ C., and preferably greater than about 0.20 cal/$cm^{3 °}$ C.). As with the high surface area values, these relatively high volumetric heat transfer coefficient value and other properties are also likely preferred for many embodiments to aid in achieving a relatively quick change in the temperature through the reactor, such as generally illustrated by the relatively steep slopes in the exemplary temperature gradient profile graphs, such as in FIGS. 1(*a*), 1(*b*), and 5. The quick temperature change is preferred to permit relatively quick and consistent quenching of the reaction to prevent the reaction from continuing too long and creating coke or carbon buildup. The cited values are averages based upon the volume of reactor used for conveyance of a reactant.

Alternative embodiments may use reactor media other than the described and preferred honeycomb monoliths, such as whereby the channel conduits/flow paths may include a more tortuous pathways (e.g. convoluted, complex, winding and/or twisted but not linear or tubular), than the previously described monoliths, including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator (27). For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure. It may be preferred that the media matrix provides high surface area to facilitate good heat exchange with the reactant and produced gases.

It may be preferred to utilize some type of equipment or method to direct a flow stream of one of the reactants into a selected portion of the conduits. In the exemplary embodiment of FIG. 2, a gas distributor (31) directs a second gas stream (32) to second gas stream channels that are substantially isolated from or not in fluid communication with the first gas channels, here illustrated as channels (33). The result is that at least a portion of gas stream (33) is kept separate from gas stream (30) during axial transit of the recuperator (27). In a preferred embodiment, the regenerative bed(s) of the recuperator zone comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

By keeping the reactants (30) and (32) substantially separated, the present invention defers or controls the location of the combustion or other heat release that occurs due to exothermic reaction. "Substantially separated" means that at least 50 percent, preferably at least 75 percent, and more preferably at least 90 percent of the reactant having the smallest or limiting stoichiometrically reactable amount of reactant, as between the first and second reactant streams, has not become consumed by reaction by the point at which these gases have completed their axial transit of the recuperator (27). In this manner, the majority of the first reactant (30) is kept isolated from the majority of the second reactant (32), and the majority of the heat release from the reaction of combining reactants (30) and (32) will not take place until the reactants begin exiting the recuperator (27). Preferably the reactants are gases, but some reactants may comprise a liquid, mixture, or vapor phase.

The percent reaction for these regeneration streams is meant the percent of reaction that is possible based on the stoichiometry of the overall feed. For example, if gas (30) comprised 100 volumes of air (80 volumes $N_2$ and 20 Volumes $O_2$), and gas (32) comprised 10 volumes of Hydrogen, then the maximum stoichiometric reaction would be the combustion of 10 volumes of hydrogen ($H_2$) with 5 volumes of Oxygen ($O_2$) to make 10 volumes of $H_2O$. In this case, if 10 volumes of hydrogen were actually combusted in the recuperator zone (27), this would represent 100 percent reaction of the regeneration stream. This is despite the presence of residual un-reacted oxygen, because that un-reacted oxygen was present in amounts above the stoichiometric requirement. Thus, the hydrogen is the stoichiometrically limiting component. Using this definition, it is preferred that less than 50 percent reaction, more preferred that less than 25 percent reaction, and most preferred that less than 10 percent reaction of the regeneration streams occur during the axial transit of the recuperator (27).

In a preferred embodiment, the channels (28) and (33) comprise materials that provide adequate heat transfer capacity to create the temperature profiles (4) and (8) illustrated in FIG. 1 at the space velocity conditions of operation. Adequate heat transfer rate is characterized by a heat transfer parameter $\Delta T_{HT}$, below about 500° C., more preferably below about 100° C. and most preferably below about 50° C. The parameter $\Delta T_{HT}$, as used herein, is the ratio of the bed-average volumetric heat transfer rate that is needed for recuperation, to the volumetric heat transfer coefficient of the bed, $h_v$. The volumetric heat transfer rate (e.g. cal/cm$^3$ sec) that is sufficient for recuperation is calculated as the product of the gas flow rate (e.g. gm/sec) with the gas heat capacity (e.g. ca./gm °C.) and desired end-to-end temperature change (excluding any reaction, e.g. °C.), and then this quantity divided by the volume (e.g. cm$^3$) of the recuperator zone (27) traversed by the gas. The $\Delta T_{HT}$ in channel (28) is computed using gas (30), channel (33) with gas (32), and total recuperator zone (27) with total gas. The volumetric heat transfer coefficient of the bed, hv, is typically calculated as the product of a area-based coefficient (e.g. cal/cm$^2$s° C.) and a specific surface area for heat transfer (av, e.g. cm$^2$/cm$^3$), often referred to as the wetted area of the packing In a preferred embodiment, channels (28) and (33) comprise ceramic (including but not limited to zirconia), alumina, or other refractory material capable of withstanding temperatures exceeding 1200° C., more preferably 1500° C., and still more preferably 1700° C. Materials having a working temperature of up to and in excess of 2000° C. might be preferred where there is concern with reaching the bed reaction adiabatic maximum temperature for sustained periods of time, to prevent reactor bed damage, provided the project economics and conditions otherwise permit use of such materials. In a preferred embodiment, channels (28) and (33) have wetted area between 50 ft$^{-1}$ and 3000 ft$^{-1}$, more preferably between 100 ft$^{-1}$ and 2500 ft$^{-1}$, and most preferably between 200 ft$^{-1}$ and 2000 ft$^{-1}$. Most preferably, channel means (28) comprise a ceramic honeycomb, having channels running the axial length of the recuperator reactor (27).

Referring again briefly to FIGS. 1(a) and 1(b), the inventive reactor system includes a first reactor (7) containing a first end (9) and a second end (11), and a second reactor (1) containing a primary end (3) and a secondary end (5). The embodiments illustrated in FIGS. 1(a), 1(b), and 2 are merely simple illustrations provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end (9), means merely that the gas may enter or exit substantially at any of the various points along an axis between the respective end face of the reactor and a mid-point of the reactor, but more preferably closer to the end face than to the mid-point.

With regard to the various exemplified embodiments, FIG. 3 illustrates an axial view of an exemplary gas distributor (31) having apertures (36). Referring to both FIGS. 2 and 3, apertures (36) may direct the second reactant gas (32) preferentially to select channels (33). In a preferred embodiment, apertures (36) are aligned with, but are not sealed to, the openings/apertures of select channels (33). Nozzles or injectors (not shown) may be added to the apertures (36) that are suitably designed to direct the flow of the second gas (32) preferentially into the select channels (33). By not "sealing" the gas distributor apertures (36) (or nozzles/injectors) to the select channels (33), these channels may be utilized during the reverse flow or reaction cycle, increasing the overall efficiency of the system. Such "open" gas distributor (31) may be preferred for many applications, over a "closed" system, to facilitate adaptation to multiple reactor systems, such as where the reactor/recuperator beds may rotate or otherwise move in relation to the location of the gas stream for processing, e.g., such as with a rotating bed type reactor system.

When a gas distributor nozzle or aperture (36) in an "open" system directs a stream of reactant gas (32) toward the associated inlet channel and associated conduits in the reactor (preferably a honeycomb monolith(s)), the contents of that stream of reactant gas (32) will typically occupy a large number of honeycomb conduits (33) as it traverses the recuperator. This outcome is a geometric result of the size of the reactor segments and/or aperture size, relative to the size of the monolith honeycomb conduits. The honeycomb conduits occupied by gas (32) may, according to a preferred embodiment, be characterized as a bundle of conduits, typically oriented along the same axis as the aperture (36) and its issuing stream of gas (32). Conduits located near the center of this bundle/channel will contain a high purity of gas (32) and thus will likely not support exothermic reaction. Conduits located near the outer edge of the bundle will be in close proximity to conduits (28) carrying the other reactant. In an "open" system as described above, some mixing of the first gas (30) and the second gas (32) will be unavoidable near the peripheral edges of each stream of gas (32) that issues from the apertures (36). Thus, some conduits (28) and (33) near the outer edge of the bundle will carry some amount of both the first gas (30) and the second gas (32). Reaction or combustion between gases (30) and (32) could happen in these conduits before the gases completely traverse recuperator (27). Such gases would still be considered to be substantially separated, as long as the resulting reaction of the regeneration streams within the recuperator (27) is less than 50 percent, preferably than less than 25 percent, and most preferably less than 10 percent of the stoichiometrically reactive reactant having the smallest or reaction limiting presence.

In some alternative embodiments, the recuperator reactor (27) may include, for example, packed bed or foam monolith materials (not shown) that permit more mixing or dispersion of reactants before fully traversing the first reactor. In this case, additional reaction may occur in the recuperator (27) due to mixing within the recuperator that is due to the axial dispersion of gases (30) and (32) as they pass though. This may still be an acceptable arrangement as long as the mixing and subsequent reaction of the regeneration streams within the recuperator (27) is less than 50 percent, preferably than less than 25 percent, and most preferably less than 10 percent. Methods for calculation of radial dispersion and mixing in bed media is known in the art.

During regeneration, the first gas (30) and second gas (32) transit the recuperator zone (27) via channels (28) and (33). It is a key aspect of this invention that heat, stored in the recuperator zone from the previous quench cycle, is transferred to both the first and second gases during the regeneration cycle. The heated gases are then introduced into mixer (44). The gas mixer (44), located between the recuperator (27) and the reactor (21), functions to mix the regenerating reaction gas streams (30) and (32), preferably at or near the interface of the reaction zone (21) and the mixer (44).

The mixer (44) is preferably constructed or fabricated of a material able to withstand the high temperatures expected to be experienced in the reaction zone during volatized hydrocarbon reforming at high selectivity and high conversion rates (>50 weight percent). In a preferred embodiment, mixer (44) is constructed from a material able to withstand temperatures exceeding 2190° F. (1200° C.), more preferably 2730° F. (1500° C.), and most preferably 3090° F. (1700° C.). In a preferred embodiment, mixer means (34) is constructed of ceramic material(s) such as alumina or silicon carbide for example.

FIG. 4 illustrates an axial view of one configuration of the mixer (44), together with a cut-away view FIG. 4a, of one exemplary embodiment of swirl-type mixer (47). The exemplary mixer (44) comprises mixer segments (45) having swirl mixer (47) located within the sections (45). In a preferred embodiment, mixer segments (45) are substantially equal in cross sectional area and the swirl mixers (47) are generally centrally located within the sections (45). Mixer segments (45) are positioned with respect to the reactor system to segment the gas flow of a plurality of gas channels (28) and (33). In a preferred embodiment, segments (45) may each have substantially equal cross sectional area to facilitate intercepting gas flow from a substantially equal number of gas channel means (28) and (33). Also in a preferred embodiment, the gas channels (28) and (33) are distributed within recuperator reactor (27) such that each of the segments (45) intercepts gas flow from a substantially equal fraction of both first gas channel means (28) and second gas channel means (33). Expressed mathematically, one can define $f_{Ai}$ as the fraction of total cross sectional area encompassed by section i, $f_{28i}$ as the fraction of total channel means (28) intercepted by section i, and $f_{33i}$ as the fraction of total channel means (33) intercepted by section i. In a preferred embodiment, for each section i, the values $f_{28i}$ and $f_{33i}$ will be within about 20 percent of (i.e. between about 0.8 and 1.2 times) the value of $f_{Ai}$, and more preferably within about 10 percent. One can further define $f_{30i}$ as the fraction of gas stream (30) intercepted by section i, and $f_{32i}$ as the fraction of gas stream (32) intercepted by the section i. In a more preferred embodiment, for each section i, the values of $f_{30i}$ and $f_{32i}$ will be within about 20 percent of $f_{Ai}$, and more preferably within about 10 percent.

FIG. 4a illustrates an exemplary cut out section of an individual gas mixer segment (45) with swirl mixer (47). While the invention may utilize a gas mixer known to the skilled artisan to combine gases from the plurality of gas channel means (28) and (33), a preferred embodiment of this invention minimizes open volume of the gas mixer (44) while maintaining sufficient mixing and distribution of the mixed gases. The term open volume means the total volume of the swirl mixers (47) and gas mixer segment (45), less the volume of the material structure of the gas mixer. Accordingly, gas mixer segment (45) and swirl mixer (47) are preferably configured to minimize open volume while concurrently providing substantial gas mixing of the gases exiting gas channels (28) and (33). In a preferred practice of the invention, gas mixer segment (45) dimensions L and D, are tailored to achieve sufficient mixing and distribution of gases (31) and (32) while minimizing open volume. Dimension ratio L/D is preferably in the range of 0.1 to 5.0, and more preferably in the range of 0.3 to 2.5. For general segments of area A, a characteristic diameter D can be computed as $2(A/\pi)^{1/2}$.

In addition, the total volume attributable to the gas mixer (44) is preferably tailored relative to the total volume of the first reactor bed (27) and reforming bed (21). Gas mixer (44) preferably has a total volume of less than about 20 percent, and more preferably less than 10 percent of the combined volume of the recuperator zone (27), the reformation zone (21), and the gas mixer (44).

Referring again to FIG. 2, the mixer (44) as configured combines gases from channels (33) and (28), and redistributes the combined gas across and into reaction zone (21). In a preferred embodiment, first reactant and second reactant are each a gas and one comprises a fuel and the other an oxidant. Fuel may comprise hydrogen, carbon monoxide, hydrocarbons, oxygenates, petrochemical streams, or mixtures thereof. Oxidant typically comprises a gas containing oxygen, commonly mixed with nitrogen, such as air. Upon mixing, the fuel and oxidant at mixer (44), the gases combust, with a substantial proportion of the combustion occurring proximate to the entrance to the reaction zone (21).

The combustion of the fuel and oxygen-containing gas proximate to the entrance of the reformer or reaction zone (21) creates a hot flue gas that heats (or re-heats) the reaction zone (21) as the flue gas travels across that zone. The composition of the oxygen-containing gas/fuel mixture is adjusted to provide the desired temperature of the reaction zone. The composition and hence reaction temperature may be controlled by adjusting the proportion of combustible to non-combustible components in the mixture. For example, non-combustible gases or other fluids such as $H_2O$, $CO_2$, and $N_2$ also may be added to the reactant mixture to reduce combustion temperature. In one preferred embodiment, non-combustible gases comprise steam, flue gas, or oxygen-depleted air as at least one component of the mixture.

Referring again to regeneration FIG. 1(b), the reacted, hot combustion product passes through reformer (1), from the secondary end (5) to the primary end (3), before being exhausted via conduit (18). The flow of combustion product establishes a temperature gradient, such as illustrated generally by example graph (8), within the reformation zone, which gradient moves axially through the reformation reaction zone. At the beginning of the regeneration step, this outlet temperature may preferably have an initial value substantially equal (typically within 25° C.) to the inlet temperature of the reforming feed of the preceding, reforming, step. As the regeneration step proceeds, this outlet temperature will increase somewhat as the temperature profile moves toward the outlet, and may end up 50° C. to 200° C. above the initial outlet temperature. Preferably, the heated reaction product in the regeneration step heats at least a portion of the second reactor, preferably the secondary end (5) of the second reactor (1), to a temperature of at least about 1500° C., and more preferably to a temperature of at least about 1600° C., and still more preferably in some processes to a temperature of at least about 1700° C. Temperature and residency time are both relevant to controlling the reaction speed and product.

Reactor system cycle time includes the time spent at regeneration plus the time spent at reforming, plus the time required to switch between regeneration and reformation and vice versa. Thus, a half cycle may be the substantially the time spent only on regeneration, or the time spend on reformation. A complete cycle includes heating the bed, feeding the volatized hydrocarbon, and quenching the acetylene containing reaction product. Typical cycle times for preferred embodiments utilizing honeycomb monoliths may be between 1 second and 240 seconds, although longer times may be desired in some alternative embodiments. More preferably for the preferred monolith embodiments, cycle times may be between 2 seconds and 60 seconds. It is not necessary that the regeneration and reformation steps to have equal times, and in a well-refined application it is likely that these two times will not be equal.

As discussed above, in one preferred aspect, provided is a process for pyrolyzing a hydrocarbon feedstock containing nonvolatiles in a regenerative pyrolysis reactor system, said process comprising: (a) heating the nonvolatile-containing hydrocarbon feedstock upstream of a regenerative pyrolysis reactor system to a temperature sufficient to form a vapor phase that is essentially free of nonvolatiles and a liquid phase containing the nonvolatiles; (b) separating said vapor phase from said liquid phase; (c) feeding the separated vapor phase to the pyrolysis reactor system; and (d) converting the separated vapor phase in said pyrolysis reactor system to form a pyrolysis product.

In another aspect, the invention includes a process for the manufacture of a hydrocarbon pyrolysis product from a hydrocarbon feed using a regenerative pyrolysis reactor system, wherein the reactor system includes (i) a first reactor comprising a first end and a second end, and (ii) a second reactor comprising primary end and a secondary end, and the first and second reactors are oriented in a series flow relationship with respect to each other such that the secondary end of the second reactor is proximate the second end of the first reactor, the process comprises the steps of: (a) heating a nonvolatile-containing hydrocarbon feedstock upstream of the regenerative pyrolysis reactor system to a temperature sufficient to form a vapor phase that is essentially free of nonvolatiles and a liquid phase containing the nonvolatiles; (b) separating the vapor phase from the liquid phase; (c) supplying a first reactant through a first channel in the first reactor and supplying at least a second reactant through a second channel in the first reactor, such that the first and second reactants are supplied to the first reactor from the first end of the first reactor; (d) combining the first and second reactants at the second end of the first reactor and reacting the combined reactants to produce a heated reaction product; (e) passing the heated reaction product through the second reactor to transfer heat from the reaction product to the second reactor to produce a heated second reactor; (f) transferring at least a portion of the separated vapor phase from step (b), and including any co-feed such as hydrogen, hydrogen donor, diluent, stripping agent, methane, etc., to the pyrolysis reactor system, and through the heated second reactor to convert at least a portion of the vapor feed into a pyrolysis product; (g) quenching the pyrolysis product, preferably in the first reactor, to halt the conversion reaction; and (h) recovering the quenched pyrolysis product from the reactor system.

The present invention also includes an apparatus for pyrolyzing a hydrocarbon feedstock containing nonvolatiles in a regenerative pyrolysis reactor system, said apparatus comprising: (a) a heater to heat a nonvolatile-containing hydrocarbon feedstock to a temperature sufficient to form a vapor phase that is essentially free of nonvolatiles and a liquid phase containing the nonvolatiles; (b) a separator to separate the vapor phase from the liquid phase; and (c) a regenerative pyrolysis reactor system to receive the separated vapor phase, heat and convert the separated vapor phase in the pyrolysis reactor system to form a pyrolysis product.

In yet another embodiment, the present invention includes an apparatus for the manufacture of a hydrocarbon pyrolysis product from a hydrocarbon feed using a regenerative pyrolysis reactor system, the apparatus comprising: (a) a heater to heat a nonvolatile-containing hydrocarbon feedstock to a temperature sufficient to form a vapor phase that is essentially free of nonvolatiles and a liquid phase containing the nonvolatiles; (b) a separator to separate the vapor phase from the liquid phase; and (c) a regenerative pyrolysis reactor system to receive the separated vapor phase and convert the separated vapor phase in said pyrolysis reactor system to form a pyrolysis product, the regenerative pyrolysis reactor system including; (i) a first reactor comprising a first end and a second end; and (ii) a second reactor comprising primary end and a secondary end, the first and second reactors are oriented in a series flow relationship with respect to each other; wherein the first reactor comprises a first channel for conveying a first reactant through the first reactor and a second channel for conveying a second reactant through the reactor.

While the present invention has been described and illustrated with respect to certain embodiments, it is to be understood that the invention is not limited to the particulars disclosed and extends to all equivalents within the scope of the claims.

What is claimed is:

1. An apparatus for pyrolyzing a hydrocarbon feedstock containing nonvolatiles in a regenerative pyrolysis reactor system, said apparatus comprising:
    (a) a heater to heat a nonvolatile-containing hydrocarbon feedstock to a temperature sufficient to form a vapor phase that is essentially free of nonvolatiles and a liquid phase containing the nonvolatiles;
    (b) a separator to separate the vapor phase from the liquid phase; and
    (c) a regenerative pyrolysis reactor system to receive the separated vapor phase, heat and convert the separated vapor phase in said pyrolysis reactor system to form a pyrolysis product.

2. The apparatus of claim 1, wherein the pyrolysis reactor comprises (i) a reaction zone for converting the separated vapor phase to the pyrolysis product within the reaction zone, and (ii) a quenching zone to quench the pyrolysis product.

3. The apparatus according to claim 1, wherein the pyrolysis reactor system comprises a reverse flow regenerative pyrolysis reactor system.

4. The apparatus according to claim 1, wherein separator comprises at least one of a distillation column, a flash drum, a knock-out drum, a flash drum having a heating means within the drum, a knock-out drum having a heating means within the knock-out drum, and combinations thereof.

5. An apparatus for the manufacture of a hydrocarbon pyrolysis product from a hydrocarbon feed using a regenerative pyrolysis reactor system, the apparatus comprising:
    (a) a heater to heat a nonvolatile-containing hydrocarbon feedstock to a temperature sufficient to form a vapor phase that is essentially free of nonvolatiles and a liquid phase containing the nonvolatiles;
    (b) a separator to separate the vapor phase from the liquid phase; and
    (c) a regenerative pyrolysis reactor system to receive the separated vapor phase and convert the separated vapor phase in said pyrolysis reactor system to form a pyrolysis product, the regenerative pyrolysis reactor system including;
        (i) a first reactor comprising a first end and a second end; and
        (ii) a second reactor comprising primary end and a secondary end, the first and second reactors are oriented in a series flow relationship with respect to each other, wherein the first reactor comprises a first channel for conveying a first reactant through the first reactor and a second channel for conveying a second reactant through the reactor.

* * * * *